United States Patent [19]

Block

[11] 4,312,765

[45] Jan. 26, 1982

[54] VISCOSIFYING AGENT

[75] Inventor: Jacob Block, Rockville, Md.

[73] Assignee: W. R. Grace & Co., New York, N.Y.

[21] Appl. No.: 893,041

[22] Filed: Apr. 3, 1978

[51] Int. Cl.³ .............................................. C09K 7/00
[52] U.S. Cl. ............................ 252/8.5 C; 252/8.5 A; 252/316
[58] Field of Search ............. 252/8.5 A, 8.5 C, 8.5 R, 252/316, 317

[56] References Cited

U.S. PATENT DOCUMENTS 3,855,147 12/1974 Granquist ........................ 252/8.5 A
4,087,365 5/1978 Clem ................................. 252/8.5 A Primary Examiner—J. L. Barr
Attorney, Agent, or Firm—Howard J. Troffkin

[57] ABSTRACT

Silane modified inorganic reaction products, aqueous-based compositions containing said reaction products, a drilling fluid containing said composition and a method of drilling bore holes using said drilling fluid, wherein the silane-modified inorganic composition comprises a reaction product of magnesium hydroxide with from about 0.005 mole to about 0.3 mole per mole of hydroxide of an organo silane represented by the general formula $$R_x SiR'_{4-x}$$

wherein R represents a $C_1$ to $C_{20}$ hydrocarbon radical, R' represents an alkoxy or halo radical and x is an integer of 1 to 3; the reaction product formed in an aqueous medium and under a high degree of agitation.

36 Claims, 1 Drawing Figure

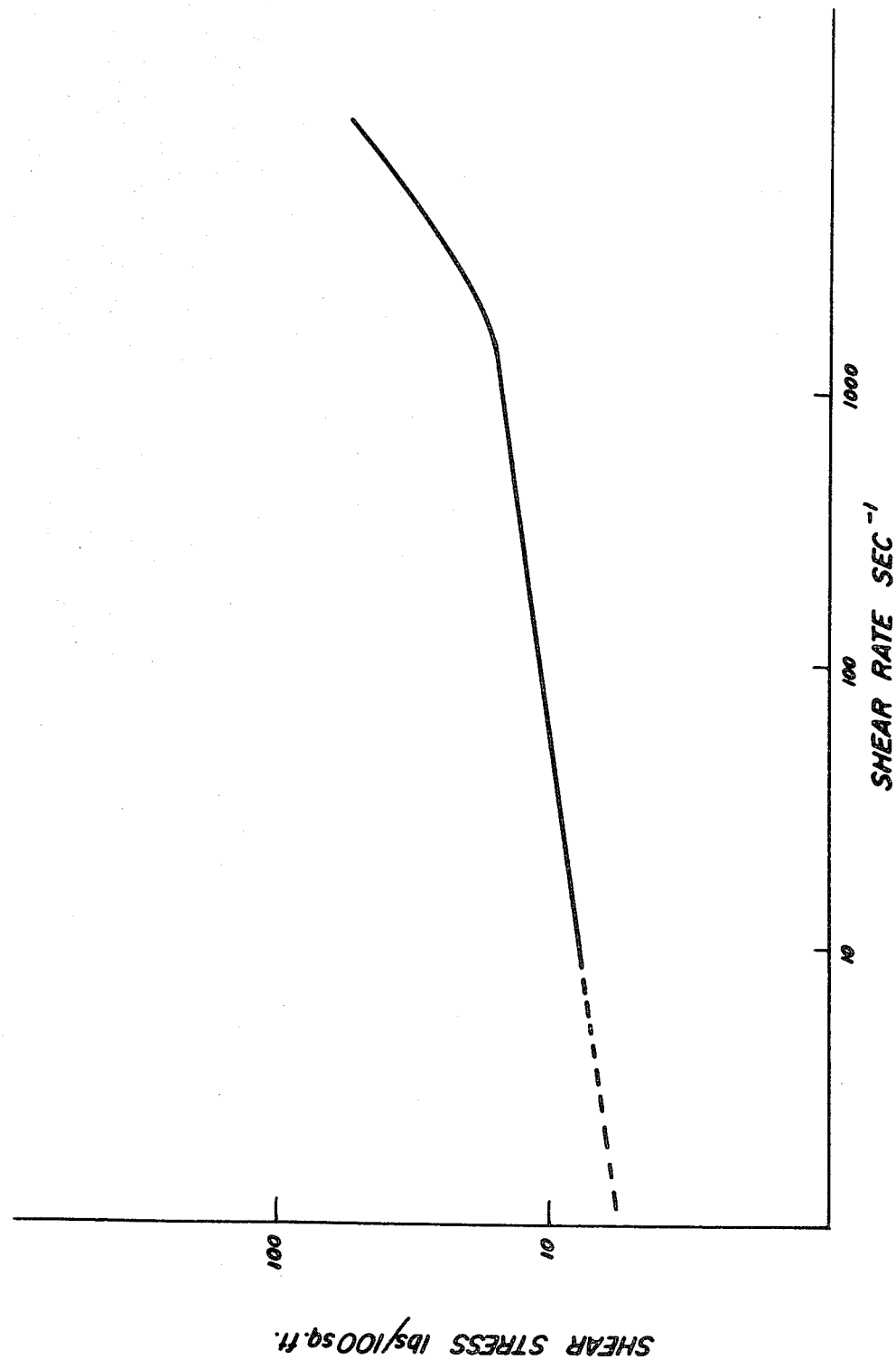

VISCOSIFYING AGENT

BACKGROUND OF THE INVENTION

The present invention relates to the formation and utilization of silane-modified inorganic polymeric materials which impart non-Newtonian pseudoplastic properties to aqueous systems. More particularly, the present invention relates to the formation of a water-based drilling fluid containing the subject material and to methods of using such fluids in the drilling of subterranean soils.

In normal well drilling operations in which a well is drilled by a rotary method, the well bore hole is generally filled with a drilling fluid or mud which is circulated therein. Drilling fluids are usually pumped down through the drill stem of the rotary rig, circulated around the drill bit and returned to the surface through the annular passage between the drill stem and well casing. These drilling fluids perform a number of functions including lubricating the drill stem and bit, cooling the bit, carrying the cuttings from the bit up the bore hole to the surface where the cuttings may be separated and disposed of, and providing a hydrostatic head against the walls of the well to prevent the collapse of the walls of the bore hole.

A primary requisite of a satisfactory drilling fluid is its ability to readily circulate and flow, that is, have low viscosity, under the high shear conditions which are present in the environs of the drill bit while, at the same time, being capable of having and maintaining sufficient viscosity to be capable of efficiently carrying the bit cuttings to the surface. It is highly desired that a drilling fluid be capable of exhibiting low viscosities under high shear conditions while also being capable of exhibiting comparatively high viscosities and carrying power under varying low shear conditions which are exerted in the annular passage between the drill stem and the well casing during the fluid's upward movement. In generic terms, a drilling fluid must exhibit non-Newtonian properties as a pseudoplastic fluid, especially under varying low shear rates.

The drilling fluid must also be capable of exhibiting the above-described pseudoplastic properties under changing environmental conditions encountered during a drilling operation due to the bore hole traversing various strata such as shales, clay, etc., and the cuttings of these materials becoming dispersed in the fluid media. The filling fluid components should be substantially stable to the presence of various calcium compounds and to sodium chloride which may be present in the fluid from the soil strata in which it is in contact and/or due to the use of salt water having calcium or sodium salts therein to form the drilling fluid.

It is also well known that as the bore hole increases in depth the temperatures encountered substantially increase above that found at the earth's surface. This is especially a problem found in drilling at depths greater than about 9,000 feet as is presently becoming a more common practice. Further, heat is also generated by frictional forces on the drill bit. It is, therefore, preferred that components used in drilling fluids be stable with respect to varying elevated temperatures.

The drilling fluid must be capable of lifting and removing the cuttings out of the hole on its upward circulation. During this upward circulation, the drilling fluid undergoes varying low shearing rates such as from about 10 to 500 sec$^{-1}$ and must have and maintain a substantial viscosity in order to effectively remove the cutting materials. The more rapidly these materials are removed, without the necessity of further grinding and pulverizing to a fine particle size by the drill bit, the more effectively the drill is permitted to act upon new subterranean soil and thereby cause an efficient drilling operation.

A wide variety of drilling fluids have been used, including aqueous based liquids, hydrocarbon based liquids, air and other gases, mist, foams and the like. For most applications the utilization of gases has been found to be impractical, as these materials do not have the density required to counterbalance the subterranean formation pressures which are encountered. Further, the gases do not readily remove the cuttings without their being finely pulverized by the drill bit. The utilization of gases as a drilling fluid thus does not generally permit an efficient deep drilling operation.

Since great volumes of drilling fluids are required for the purposes of providing a cooling medium for the rotary bit and a means of carrying off the drilled particles, the conventional fluids used in this application are based on water. Water alone, being a Newtonian fluid, does not have the needed capability to efficiently carry the drilled particles from the bore hole to the surface. This becomes increasingly apparent as the bore hole increases in depth.

It is widely held and accepted theory that viscosities suitable for creating a particle carrying capacity in the fluid can best be achieved with fluids having non-Newtonian, pseudoplastic properties, that is, that the viscosity must be sufficient to prevent the drilled particles from separating from the drilling fluid when the agitation of the fluid has diminished. For example, a drilling fluid must have a low viscosity under the high shear rate encountered at the drill bit while having the ability to increase in viscosity (and, therefore, particle holding power) under decreasing shear rates encountered in its upward movement.

In order to obtain the desirable viscosity properties, clay or colloidal clay bodies such as bentonite of Fuller's earth have been added to drilling fluids. As a result, such drilling fluids have been usually referred to as "muds". The use of clay-based drilling fluids has provided the means of initially meeting the two basic requirements of drilling fluids, i.e., cooling and particle removal. However, the clay-based drilling fluids are highly unstable when they come in contact with various salts found in drilled earth formations.

Materials which have come into expanding use as components of drilling compositions are Xanthan gums such as are described in U.S. Pat. Nos. 3,198,268; 3,208,526; 3,251,147; 3,243,000; 3,307,016 and 3,319,715. These materials have been found to cause aqueous solutions, such as drilling fluids, to exhibit pseudoplastic properties under varying low shear forces. However, these materials, whether used alone or in combination with other additives, present the problem of being irreversibly degraded by the elevated temperatures encountered during conventional drilling operations and thereby require continuous supplementation of material. The high cost of the Xanthan gums, and the high rate of degradation, limits their usefulness to specialized operations.

There is a general need for a drilling fluid which is capable of being produced at low cost and which renders an aqueous drilling fluid pseudoplastic so as to permit ease of fluidity under high shear conditions such as found at the drill bit site, while being capable of acting as an efficient carrier and remover of drilled particles.

SUMMARY OF THE INVENTION

It is an object of the present invention to form a reaction product which is a useful viscosifier for aqueous systems. Further, it is an object of the present invention to form water-based fluids useful for drilling bore holes and the like which contain the subject reaction product to render the fluid capable of exhibiting non-Newtonian or pseudoplastic properties so as to be capable of efficiently carrying away the drill bit cuttings. Still further, it is the object of the present invention to form a drilling fluid which is substantially stable to varying environmental conditions of temperature and salt content normally encountered in bore hole drilling.

The present invention is directed to silane-modified inorganic reaction products, aqueous compositions containing the reaction product, drilling fluids containing said compositions and methods of drilling bore holes and the like with said drilling fluid wherein said composition is a reaction product, formed in an aqueous medium, of a magnesium hydroxide with from about 0.005 to 0.3 mole per mole of oxide of a silane represented by the formula $R_xSiR'_{4-x}$ wherein R represents a $C_1$ to $C_{20}$ hydrocarbon radical, R' represents an alkoxy or halogen radical and x is an integer of from 1 to 3.

DETAILED DESCRIPTION OF THE INVENTION

The present invention is directed to the formation of certain inorganic polymer products, the utilization of these products as a viscosifier for water-based systems and, in particular, as an essential component in a drilling fluid composition to cause the composition to exhibit pseudoplastic properties, and to methods of drilling bore holes and the like into the earth utilizing the subject drilling fluid composition. Specifically, the subject invention is directed to an organo-silane-modified magnesium hydroxide inorganic viscosifying material.

The inorganic polymer products of the subject invention can be formed from any water-soluble precursor or compound which is capable of forming a magnesium hydroxide in situ in an aqueous solution as described hereinbelow.

Aqueous suspensions (the terms "suspensions" or "system" used in the present description and appended claims refers to suspensions, dispersions or mixtures thereof, alone or including solutions) of the desired hydrous magnesium hydroxide can be formed from a magnesium precursor agent or compound which is water soluble. The precursor agent or compound can be any agent or compound capable of readily reacting with a base to form magnesium hydroxide in situ in an aqueous medium. The preferred precursors are water-soluble salts of magnesium such as magnesium halides as, for example, magnesium chloride, magnesium chloride hydrate, magnesium bromide, magnesium bromide hydrate, magnesium iodide or magnesium iodide hydrate and the like, as well as other magnesium salts such as magnesium sulfate, magnesium sulfate hydrate and magnesium nitrate, magnesium nitrate hydrate, magnesium acetate, and the like. The precursor agents of magnesium chloride, magnesium sulfate and their hydrate forms are most preferred.

The magnesium hydroxide hydrogel is formed by reacting precursor compounds discussed hereinabove in known manners, such as by contacting an aqueous solution having an effective amount, such as about 15 to 30 percent, of a precursor compound with a sufficient amount of a strong base. The base can be any alkali metal hydroxide, alkali metal oxide, calcium hydroxide or oxide, or ammonium hydroxide, or mixtures thereof, with sodium or potassium hydroxide or calcium oxide being preferred. As discussed hereinbelow, the amount of base should be sufficient to cause substantially complete conversion of the magnesium precursor compound and, preferably, should be present in an excess amount of about 10 to 50 percent to cause an alkaline pH of at least about 10 and preferably from about 10 to 13.

The silane-modified inorganic magnesium hydroxide reaction products are formed by initiating the in situ formation of magnesium hydroxide hydrogel and contacting the forming material with from 0.005 to 0.3 mole, and most preferably from between 0.01 to 0.1 mole, per molar equivalent of magnesium, of a silane. The silane is contacted with the forming magnesium hydroxide in an aqueous medium and under a high degree of agitation to cause a substantially uniform distribution of the silane.

The silanes found useful in forming the modified inorganic material of the present invention are represented by the formula $R_xSiR'_{4-x}$ in which R represents a $C_1$ to $C_{20}$ and preferably a $C_1$ to $C_6$ hydrocarbon radical; R' represents an alkoxy or halo radical; and x is an integer of from 1 to 3. For example, the symbol R can represent an alkyl radical such as methyl, ethyl, vinyl, propyl, methylvinyl, butyl, pentyl, hexyl, decyl, octadecyl, nonadecyl and the like; a cycloalkyl radical such as cyclohexyl, cyclopentyl and the like; an aryl radical such as phenyl, toluyl, and the like. R' can represent a bromo, chloro, iodo and the like halo radical, with chloro being preferred; further, R' can represent an alkoxy radical represented by OR'' in which R'' is the same as R described hereinabove and preferably is a $C_1$ to $C_3$ alkyl or a phenyl radical. Examples of silanes which are useful in forming the reaction product of the present invention and in forming drilling fluid compositions as disclosed herein include alkylhalosilanes such as methyltrichlorosilane, dimethyldichlorosilane, trimethylchlorosilane, ethyltrichlorosilane, diethyldichlorosilane, trichlorovinylsilane, i-propyltrichlorosilane, octadecyltrichlorosilane and the like, arylhalosilane such as triphenylchlorosilane, diphenyldichlorosilane, phenyltrichlorosilane and the like; alkylalkoxysilanes such as trimethoxymethylsilane, trimethoxyethylsilane, triethylmethoxysilane, triethylethoxysilane and the like; and arylalkoxysilanes such as phenyltriethoxysilane, diphenyldiethoxysilane, triphenylethoxysilane, and the like.

In order to obtain the desired products of the present invention, the silane should be used in certain specific amounts. The amount of silane employed should be from about 0.005 to 0.3, and preferably from 0.01 to 0.1 mole of silane per mole of magnesium. Products which are formed with an amount of silane outside of the above range do not have the desired properties. The silane material should be added prior to complete formation of the magnesium hydroxide hydrogel. Preferably the silane should be added within about five minutes after initiation of the hydroxide formation and under a high degree of agitation. This is to assure uniform distribution throughout the material and, therefore, substantially uniform reaction of the forming magnesium hydroxide polymer with the organic silane modifying agent. The addition of the silane within less than about three minutes is preferred to cause substantial uniform reaction. It is most preferable to add the silane material simultaneously with the initiation or within a short period after the initiation of the formation of the subject hydroxide.

Although the exact reaction of the silane and the inorganic material is not shown, it is believed that the silane, when used in the present amounts and manner causes a certain degree of disorientation of the inorganic magnesium hydroxide lattice while forming therein unhydrolyzable silicon to carbon bonds to cause the resultant material to unexpectedly exhibit non-Newtonian pseudoplastic properties as discussed hereinbelow. This theory is not intended to be a limitation on the subject invention.

The reaction product of the instant invention can be formed into a solid product by the removal of the water in which the subject reaction product is formed. This drying can be accomplished by various known drying means such as by spray drying of the formed suspension using conventional spray drying techniques and apparatus. Alternatively, aqueous suspensions having the reaction product therein can be concentrated by conventional evaporation techniques. Such concentrated suspensions can be subsequently diluted or added to previously formed water-based systems to cause the resultant system to have a desired concentration of active solids (hydroxide plus silane).

The above described silane modified inorganic reaction products are capable of causing an aqueous system to exhibit non-Newtonian pseudoplastic rheological properties, that is to say, that the viscosity of the resultant aqueous suspension varies inversely with respect to the shear rate exerted on the system. The presently achieved pseudoplastic properties can be described by the relationship of the shear stress with respect to shear rate in accordance with the known rheological power law model relationship of $$\tau = K(\delta)^n$$

in which $\tau$ represents the shear stress of an aqueous system in units such as pounds per 100 ft$^2$ or dynes/cm$^2$; $\delta$ is the shear rate in sec$^{-1}$; K is a constant defined by shear stress of the solution at a shear rate of 1 sec$^{-1}$ and n has a numerical value of from 0 to 1. It has been unexpectedly found that aqueous systems containing the presently described silane-modified inorganic oxides exhibit shear stress ($\tau$) properties at varying shear rates ($\delta$) in the range of from about 10 to 500 sec$^{-1}$ or greater, that is, in the range normally encountered in the annular region of the bore hole, such that n of the power law relationship has a value of up to about 0.4. Such systems, therefore, exhibit non-Newtonian pseudoplastic properties to a highly desirable degree.

FIG. 1 is a typical graphic presentation of the shear stress at varying shear rates which are obtained from aqueous suspension containing the presently disclosed product. When plotting log shear stress versus log shear rate with log shear stress being plotted on the abscissa and log shear rate on the ordinate of the graph, the desired properties are readily apparent. At low shear ranges, such as from about 10 to about 500 sec$^{-1}$, as are encountered in the annular region of the bore hole, the shear stress should increase at a low rate with respect to the shear rate exerted on the material which is observed as a low slope (or n value according to the power law relationship) of the curve in this region. At high shear rates, such as are found in the region of a drill bit in a drilling operation, the fluid should have low viscosity and approach a Newtonian liquid, as can be seen by an increased slope of the curve. The value of K in the power law model relationship is the shear stress value determined or extropolated for a shear rate of 1 sec$^{-1}$.

The resultant products of the present invention can be readily suspended or dispersed in water-base compositions. The desired pseudoplastic properties are achieved when the resultant products are used in aqueous systems in concentrations ranging from about 2 to about 12 percent, and preferably from about 3 to 6 percent by weight based on the weight of water. Water-based compositions, such as paints and the like, containing the resultant product can contain other conventional additives, such as dyes, fillers, and the like, to form compositions where pseudoplastic properties, as discussed above, are desired.

It has been further unexpectedly found that the silane-modified inorganic reaction products formed according to the present invention yield aqueous systems which, as well as having the unexpectedly achieved pseudoplastic properties, have excellent stability to temperature, calcium and sodium salts and various other conditions desired of a drilling fluid used in rotary drilling of bore holes and the like. Therefore, an additional embodiment of the subject invention is the formation of drilling fluids and their utilization in the drilling of bore holes and the like, wherein the drilling fluid contains as the viscosifying agent therein a reaction product described hereinabove. It is preferred that the active solids (magnesium hydroxide plus silane) of the reaction product be present in the drilling fluid in from about 2 to 10 percent by weight and preferably from 2.5 to 5 percent based on the water content.

The drilling fluids containing the subject silane-modified hydrous magnesium hydroxide have unexpectedly been found to have high degrees of stability with respect to their rheological properties under various adverse conditions. Such fluids have been found to be stable after subjection to elevated temperatures for sustained periods, to high shear rates such as are encountered at the site of the drill bit, as well as being stable in the presence of various corrosive elements such as calcium chloride, calcium oxide and sodium chloride which are commonly entrained in such fluids.

The high degree and breadth of stability of the reaction product of the present invention when combined with its ability to exhibit non-Newtonian pseudoplastic properties under varying low shear rates of from about 10 to 500 sec$^{-1}$ and greater, such as are encountered in the annular region between the drill stem and the bore hole casing, shows that drilling fluids containing the present reaction product would aid in increasing drilling efficiency, that is, the rate of drilling a bore hole.

The drilling fluid composition of the subject invention can contain other conventional drilling fluid additives in manners and amounts well known to those skilled in the art such as water loss inhibitors as, for example, polyanionic cellulose and the like; wetting agents such as lignosulfonate metal salts and the like, weighting agents as, for example, crushed oyster shells, barites, hematite, magnetite and the like; as well as other components conventionally used in this art. The terms "water-base system", "water-containing system" and the like, which are used herein in describing the present invention, generally include systems and drilling fluids which have a liquid base comprising substantially fresh or salt water. However, it is to be realized that at times certain small amounts of other liquids may be emulsified or admixed with the water-based system. For example, drilling fluids may at times contain small amounts of oil emulsified or admixed with the drilling fluid. The oil can come either from an oil formation drilled into or, under certain conditions, can be purposely added to the system.

The silane-modified magnesium hydroxide reaction product of the present invention can be added to a water system, such as drilling fluids, utilizing conventional means such as pumps and metering devices commonly used in the art. The reaction product can be added to a water-based system either by the addition of previously formed solid material or by the addition of an aqueous suspension, which may or may not have been previously concentrated. For example, the solid or concentrated suspension can be added to the drilling fluid by means of conventional metering pumps and the like. In all other respects the drilling procedures will be carried out in conventional manners known to those skilled in this art.

The following examples are given for illustrative purposes only and are not meant to limit the invention except as defined by the claims set forth hereinbelow. Parts and percentages are by weight unless otherwise indicated. Values for K of the power law relationship are given in terms of pound-sec/100 ft$^2$.

EXAMPLE I

A silane-modified magnesium hydroxide was prepared by initially reacting under high speed mixing 235 parts of a 20 percent aqueous magnesium sulfate solution with 132 parts of a 10 N sodium hydroxide solution. After the solution started to thicken (within 1 minute) and while continuing the high speed mixing, 5.2 parts of commercially obtained diethoxydimethyl silane were added to the mixture. The resultant aqueous system had a pH of 12.1 and an active solid (Mg(OH)$_2$+silane) content of 6 percent.

The system was subjected to high shear by circulation through a 0.032 inch ID capillary tube for about 30 minutes. The resultant aqueous system was tested for rheological properties using standard procedures with a Haake Rotovisco viscometer (Model RV-I) at varying low shear rates. The values of n and K of the power law model relationship were determined to be 0.11 and 128.0 for shear rates of from 10 sec$^{-1}$ to rates extending out to over 1300 sec$^{-1}$.

EXAMPLE II

A sample formed in the same manner as in Example I was diluted with distilled water to give a resultant aqueous system having 4.5 percent active solids therein. Rheological properties were tested in the manner described in Example I. The n and K values were determined to be 0.14 and 35.0 for shear rates extending beyond 1100 sec$^{-1}$.

EXAMPLE III

The aqueous system of silane-modified magnesium hydroxide reaction product formed in accordance with Example I above was diluted with distilled water to give a system having an active solid content of 3 percent. Rheological determinations were made in the manner described in Example I and n and K were determined to be 0.19 and 9.2 respectively at shear rates extending to about 700 sec$^{-1}$.

Further, the sample was subjected to 250 degrees F. for 16 hours in a sealed rotating cell having been purged with N$_2$ gas. The sample was allowed to cool to ambient temperatures and its rheological properties retested. The results showed that n and K remained virtually constant (n=0.15; K=10.0).

EXAMPLE IV

A sample of silane-modified magnesium hydroxide was prepared in the manner described in Example I above. The sample was spray dried using a conventional cyclone drier with an inlet temperature of 225 degrees F. The resultant product was a solid particulate material. The solid material was reconstituted with distilled water at varying concentrations and tested for rheological properties. The samples were then subjected to high shear forces (50,000 sec$^{-1}$) by circulating the sample through a capillary tube 0.032 in. ID continuously for 30 minutes and then retested. The samples showed substantially no degradation after subjection to high shear The values for n and K are given in Table I below.

TABLE 1

| (Weight percent active solid) | Unsheared | | High shear | |
|---|---|---|---|---|
| | n | K | n | K |
| 5 | 0.17 | 5.8 | 0.17 | 9.8 |
| 4.2 | 0.22 | 2.2 | 0.23 | 5.0 |
| 3.75 | | | 0.24 | 3.7 |
| 3.1 | 0.32 | 0.6 | | |

EXAMPLE V

An aqueous system of silane modified magnesium hydroxide reaction product was formed in the manner described in Example I above. The resultant suspension (3 percent active solids) was subjected to high shear forces of 50,000 sec$^{-1}$ for 30 minutes and tested in the presence of various levels of sodium and calcium chloride and at elevated temperatures. The n and K values are indicated below.

| | n | K |
|---|---|---|
| Standard | 0.19 | 9.2 |
| 250 deg. F for 16 hours | 0.15 | 10.0 |
| 5% CaCl$_2$ | 0.25 | 12.4 |
| 3.5% NaCl | 0.25 | 8.6 |
| 10% NaCl | 0.20 | 13.7 |

EXAMPLE VI

A portion of the silane-modified magnesium hydroxide formed as in Example I was diluted with deionized water to give a K value of about 11. To a 90-part portion of this material was added 10 parts of CaO and after one-half hour the rheology was tested. The n and K before CaO addition was 0.14 and 11.1 respectively, and compares favorably with the n and K values of CaO added samples of 0.12 and 16.4 respectively.

EXAMPLE VII

Samples of silane-modified magnesium hydroxide were formed in the manner described in Example I except that magnesium chloride was used as the precursor agent. Additional samples were made with varying amounts of excess base (NaOH). The aqueous systems comprising suspension of silane-modified magnesium hydroxide were tested for rheological properties and the results are given below.

TABLE 2

| Precursor | Agent | % Excess NaOH | Final pH | Low Shear n | K |
|---|---|---|---|---|---|
| MgSO₄ (Ex. I) | | 50 | 12.3 | 0.19 | 9.2* |
| MgCl₂ | | 50 | 12.4 | 0.19 | 9.4 |
| MgCl₂ | | 36 | 12.3 | 0.27 | 3.4 |
| MgCl₂ | | 25 | 12.2 | 0.29 | 2.9 |
| MgCl₂ | | 14 | 11.6 | 0.21 | 5.2 |

*Samples subjected to high shear for 30 minutes prior to testing. A K value of 5.2 unsheared sample is equivalent to K = 9.2 for sheared sample.

EXAMPLE VIII

Samples of silane-modified magnesium hydroxide were prepared using CaO as the base to be contacted with the magnesium hydroxide precursor. The precursor was varied between magnesium sulfate and magnesium chloride.

235 parts of a Mg salt solution (either chloride [30.1 percent MgCl₂ . 6 H₂O] or sulfate [17.1 percent MgSO₄]) were contacted, under high speed mixing, with CaO. The mixing was continued for about 5 minutes and then 5.2 parts diethoxydimethylsilane were added. Mixing was continued for an additional 5 to 10 minutes. Table 3 below summarizes the samples prepared and their properties.

TABLE 3
Rheology of Modified Mg(OH)₂ Prepared with CaO

| Sample No. | Mole Ratio CaO/Mg | Mg Salt | Final pH | Density(c) (lb/gal.) | Low Shear n | K |
|---|---|---|---|---|---|---|
| VIII A | 2.57 | SO₄ | 12.3 | 10.2 | 0.22(a) | 11.8(a) |
| VIII B | 3.77 | SO₄ | 12.1 | 10.0 | 0.23(b) | 3.9(b) |
| VIII C | 2.57 | Cl | 10.9 | 9.2 | 0.23(b) | 6.0(b) |
| VIII D | 3.77 | Cl | 10.8 | 9.2 | 0.19(b) | 13.2(b) |

(a)At 4% active solids.
(b)At 3% active solids.
(c)Density of similar material prepared with NaOH at 3% active solids is 9.2 lb/gal.

EXAMPLE IX

Several samples were made with silanes of varying functionality (number of R' groups) using trimethylethoxysilane (functionality=1) or methyltriethoxysilane (functionality=3); the silane to Mg molar ratio was varied; the precursor was varied between CaO and NaOH; and the base to Mg molar ratio varied between 1.2 and 1.5; and the silane was added with the base or 1 minute after the addition of base. The aqueous solution was stirred at a high speed during the formation of the reaction product. The results are indicated in Table 4 below:

TABLE 4

| Run No. | Functionality of Silane | Silane/Mg mole ratio | Type of Salt | Base/Mg ratio | Type of Base | Order of Addition | pH (after prep.) | pH (after 24 hours) | Low Shear n | K | CaCl₂ n | K | After Roller Oven n | K | pH After Roller Oven |
|---|---|---|---|---|---|---|---|---|---|---|---|---|---|---|---|
| 1 | 1 | .10 | SO₄ | 1.5 | CaO | after | 9.0 | 12.0 | 0.17 | 6.6 | 0.18 | 9.6 | 0.38 | 0.56 | 11.8 |
| 2 | 1 | .05 | Cl | 1.5 | NaOH | after | 11.9 | 11.5 | 0.18 | 11.1 | 0.21 | 14.0 | 0.25 | 6.2 | 11.7 |
| 3 | 3 | .05 | Cl | 1.5 | CaO | after | 10.6 | 10.9 | 0.36 | 7.0 | 0.34 | 5.6 | 0.35 | 4.40 | 11.3 |
| 4 | 3 | .10 | Cl | 1.5 | CaO | with | 10.7 | 10.8 | 0.29 | 6.6 | 0.25 | 4.35 | 0.30 | 5.2 | 11.2 |
| 5 | 1 | .05 | SO₄ | 1.5 | CaO | with | 11.5 | 12.0 | 0.18 | 11.5 | 0.18 | 11.0 | 0.32 | 2.65 | 11.9 |
| 6 | 1 | .10 | Cl | 1.2 | CaO | after | 10.9 | 11.1 | 0.19 | 3.42 | 0.18 | 3.60 | 0.19 | 4.90 | 11.2 |
| 7 | 3 | .05 | SO₄ | 1.2 | CaO | after | 8.9 | 11.9 | 0.15 | 2.60 | 0.12 | 4.50 | 0.30 | 0.92 | 11.3 |
| 8 | 1 | .05 | Cl | 1.2 | CaO | with | 10.6 | 11.1 | 0.20 | 2.75 | 0.19 | 3.50 | 0.14 | 10.0 | 11.2 |
| 9 | 3 | .10 | Cl | 1.5 | CaO | with | 11.0 | 11.0 | 0.36 | 5.3 | 0.33 | 2.80 | 0.14 | 5.4 | 11.2 |
| 10 | 1 | .10 | Cl | 1.5 | NaOH | with | 11.9 | 11.8 | 0.20 | 8.4 | 0.21 | 12.0 | 0.22 | 3.00 | 12.0 |
| 11 | 1 | .05 | Cl | 1.5 | NaOH | after | 11.9 | 11.8 | 0.18 | 10.5 | 0.19 | 16.4 | 0.22 | 2.70 | 11.8 |
| 12 | 3 | .10 | SO₄ | 1.2 | CaO | with | 8.9 | 12.0 | 0.13 | 3.50 | 0.13 | 4.70 | 0.20 | 1.48 | 11.7 |
| 13 | 3 | .10 | SO₄ | 1.2 | CaO | with | 8.9 | 11.9 | 0.20 | 2.40 | 0.19 | 2.90 | 0.21 | 0.98 | 11.6 |
| 14 | 1 | .10 | SO₄ | 1.5 | CaO | after | 11.7 | 12.0 | 0.21 | 10.0 | 0.17 | 12.2 | 0.23 | 3.80 | 11.9 |

EXAMPLE X

Silane modified magnesium hydroxide (SMMH) aqueous systems were made using the procedure of Example VII. The molar ratio of silane to Mg was 0.1 and the base (NaOH) was added in 50 percent excess. The sample was tested for rheology and stability with various salts before and after subjection to 250 degrees F. for 16 hours.

For comparative purposes a commercially available Xanthan gum (Kelzan XC) was formed into an aqueous system without and with varying concentrations of salts as done with the silane-modified samples above. Rheology and stability tests were conducted in the same manner as with the above silane modified samples. Results are indicated in Table 5 below.

TABLE 5

| Sample | Low Shear n | K | After 250 deg. F for 16 hours n | K |
|---|---|---|---|---|
| 0.5% Xanthan gum | 0.23 | 8.7 | 1.0 | <0.1 |
| 0.5% Xanthan Gum + 0.5% CaCl₂ | 0.30 | 4.05 | 1.0 | <0.1 |
| 0.5% Xanthan gum + 5% CaCl₂ | 0.33 | 5.0 | 1.0 | <0.1 |
| 0.5% Xanthan gum + 3.5% NaCl | 0.27 | 4.35 | 1.0 | <0.1 |
| 0.5% Xanthan gum + 10% NaCl | 0.31 | 3.75 | 1.0 | <0.1 |
| 3% SMMH | 0.20 | 6.7 | 0.22 | 6.9 |
| 3% SMMH + 0.5% CaCl₂ | 0.22 | 9.3 | 0.23 | 4.48 |
| 3% SMMH + 5% CaCl₂ | 0.30 | 6.4 | 0.31 | 2.31 |
| 3% SMMH + 3.5% NaCl | 0.18 | 8.3 | 0.21 | 7.6 |
| 3% SMMH + 10% NaCl | 0.20 | 7.4 | 0.21 | 6.2 |

While the invention has been described in connection with certain preferred embodiments, it is not intended to limit the invention to the particular forms set forth, but, on the contrary, it is intended to cover such alternatives, modifications and equivalents as defined by the appended claims.

What is claimed is:

1. A silane-modified inorganic composition consisting essentially of a reaction product of magnesium hydroxide hydrogel and a silane represented by the formula $R_xSiR'_{4-x}$ wherein R is a $C_1$ to $C_{20}$ hydrocarbon, R' is a halo or a $C_1$ to $C_{20}$ alkoxy radical and x is an integer of from about 1 to 3; said reaction product formed by initiating the formation of a magnesium hydroxide hydrogel by contacting about 15 to about 30 weight percent aqueous solution of a water-soluble magnesium precursor agent capable of forming a magnesium hydroxide hydrogel with a sufficient amount of a base to cause substantially complete conversion of the magnesium precursor agent to the hydroxide; contacting the forming magnesium hydroxide hydrogel with from about 0.005 to 0.3 mole of said silane per mole of magnesium hydroxide; and causing the resultant aqueous suspension containing said reaction product to have a pH of at least about 10.

2. The composition of claim 1 wherein the amount of silane is from about 0.01 to 0.2 mole per mole of magnesium, and R is a $C_1$ to $C_6$ alkyl or aryl group.

3. The composition of claim 1 wherein R is a phenyl or a $C_1$ to $C_3$ alkyl, R' is a halo or $C_1$ to $C_3$ alkoxy and the silane to magnesium molar ratio is 0.01:1 to 0.1:1.

4. The composition of claim 1 wherein the magnesium hydroxide hydrogel is initiated by contacting a water soluble magnesium salt with a base selected from an alkali metal oxide, calcium hydroxide, calcium oxide, alkali metal hydroxide or ammonium hydroxide, and the pH of the resultant aqueuous suspension of the reaction product is from about 10 to 13.

5. The composition of claim 4 wherein the water-soluble magnesium salt is a magnesium sulfate.

6. The composition of claim 4 wherein the water-soluble magnesium salt is a magnesium chloride.

7. The composition of claim 4 wherein the base is sodium hydroxide and the magnesium salt is selected from magnesium sulfate or magnesium chloride.

8. The composition of claim 1 wherein the reaction product is removed from the suspension as a solid, particulate material.

9. The composition of claim 8 wherein the silane-modified inorganic reaction product is removed from the aqueous suspension by spray drying.

10. An aqueous composition comprising from about 2 to 10 percent by weight of the reaction product of claim 1.

11. An aqueous composition comprising from about 2 to 10 percent by weight of the reaction product of claim 2.

12. An aqueous composition comprising from about 2 to 10 percent by weight of the reaction product of claim 3.

13. An aqueous composition comprising from about 2 to 10 percent by weight of the reaction product of claim 4.

14. An aqueous composition comprising from about 2 to 10 percent by weight of the reaction product of claim 5.

15. An aqueous composition comprising from about 2 to 10 percent by weight of the reaction product of claim 6.

16. An aqueous composition comprising from about 2 to 10 percent by weight of the reaction product of claim 7.

17. An aqueous composition comprising from about 2 to 10 percent by weight of the reaction product of claim 8.

18. An aqueous composition comprising from about 2 to 10 prcent by weight of the reaction product of claim 9.

19. A water-base drilling fluid composition having as its aqueous base the aqueous composition of claim 10.

20. A water-base drilling fluid composition having as its aqueous base the aqueous composition of claim 11.

21. A water-base drilling fluid composition having as its aqueous base the aqueous composition of claim 12.

22. A water-base drilling fluid composition having as its aqueous base the aqueous composition of claim 13.

23. A water-base drilling fluid composition having as its aqueous base the aqueous composition of claim 14.

24. A water-base drilling fluid composition having as its aqueous base the aqueous composition of claim 15.

25. A water-base drilling fluid composition having as its aqueous base the aqueous composition of claim 16.

26. A water-base drilling fluid composition having as its aqueous base the aqueous composition of claim 17.

27. A water-base drilling fluid composition having as its aqueous base the aqueous composition of claim 18.

28. In a process for drilling a bore hole with borehole drilling tools and utilizing a water-based drilling fluid circulating in the bore hole, wherein the water-based drilling fluid is a fluid according to claim 19.

29. In a process for drilling a bore hole with borehole drilling tools and utilizing a water-based drilling fluid circulating in the bore hole, wherein the water-based drilling fluid is a fluid according to claim 20.

30. In a process for drilling a bore hole with borehole drilling tools and utilizing a water-based drlling fluid circulating in the bore hole, wherein the water-based drilling fluid is a fluid according to claim 21.

31. In a process for drilling a bore hole with borehole drilling tools and utilizing a water-based drilling fluid circulating in the bore hole, wherein the water-based drilling fluid is a fluid according to claim 22.

32. In a process for drilling a bore hole with borehole drilling tools and utilizing a water-based drilling fluid circulating in the bore hole, wherein the water-based drilling fluid is a fluid according to claim 23.

33. In a process for drilling a bore hole with borehole drilling tools and utilizing a water-based drilling fluid circulating in the bore hole, wherein the water-based drilling fluid is a fluid according to claim 24.

34. In a process for drilling a bore hole with borehole drilling tools and utilizing a water-based drilling fluid circulating in the bore hole, wherein the water-based drilling fluid is a fluid according to claim 25.

35. In a process for drilling a bore hole with borehole drilling tools and utilizing a water-based drilling fluid circulating in the bore hole, wherein the water-based drilling fluid is a fluid according to claim 26.

36. In a process for drilling a bore hole with borehole drilling tools and utilizing a water-based drilling fluid circulating in the bore hole, wherein the water-based drilling fluid is a fluid according to claim 27.

* * * * *